(12) United States Patent
Sivakumar et al.

(10) Patent No.: US 7,742,404 B2
(45) Date of Patent: Jun. 22, 2010

(54) SYSTEMS AND METHODS OF NETWORK MONITORING

(75) Inventors: Raghupathy Sivakumar, Alpharetta, GA (US); Aravind Velayutham, Atlanta, GA (US)

(73) Assignee: Asankya Networks, Inc., Atlanta, GA (US)

( * ) Notice: Subject to any disclaimer, the term of this patent is extended or adjusted under 35 U.S.C. 154(b) by 458 days.

(21) Appl. No.: 11/678,430

(22) Filed: Feb. 23, 2007

(65) Prior Publication Data

US 2007/0223481 A1 Sep. 27, 2007

Related U.S. Application Data

(60) Provisional application No. 60/776,546, filed on Feb. 23, 2006.

(51) Int. Cl.
*H04L 12/26* (2006.01)
(52) U.S. Cl. ................. 370/229; 370/241; 370/252; 709/224
(58) Field of Classification Search ................ None
See application file for complete search history.

(56) References Cited

U.S. PATENT DOCUMENTS 5,832,503 A * 11/1998 Malik et al. .............. 709/223
5,937,163 A    8/1999  Lee et al.
5,974,237 A *  10/1999 Shurmer et al. ........... 709/224
6,336,138 B1 * 1/2002  Caswell et al. ............ 709/223
6,707,818 B1   3/2004  Kadambi et al.
7,117,261 B2 * 10/2006 Kryskow et al. ........... 709/223
7,342,897 B1 * 3/2008  Nader et al. ............... 370/255
2004/0111461 A1 6/2004  Claudatos et al.
2005/0027835 A1 * 2/2005 Raikar et al. ............. 709/223
2005/0152397 A1 7/2005  Bai et al.
2006/0070084 A1 * 3/2006 Novik et al. .............. 719/318

OTHER PUBLICATIONS

International Search Report, PCT/US2007/62738, Oct. 26, 2007.

* cited by examiner

*Primary Examiner*—Chi H Pham
*Assistant Examiner*—Soon-Dong D Hyun
(74) *Attorney, Agent, or Firm*—Ballard Spahr LLP

(57) ABSTRACT

Systems and methods of network monitoring are disclosed. One exemplary method includes receiving a first packet, creating a filter instance if the first received packet matches a filter template, receiving a second packet, and storing the second received packet if the second received packet matches the created filter instance. The filter instance is based at least partially on the filter template. An exemplary system includes a network interface, a memory, and a processor. The memory stores program code which programs the network monitor device to receive a first packet, create a filter instance if the first received packet matches a filter template, receive a second packet, and store the second received packet if the second received packet matches the created filter instance. The filter instance is based at least partially on the filter template.

16 Claims, 7 Drawing Sheets

|  | Device-Level | Interface-Level | Link-Level | Path-Level | Site-Level | Application-Level |
|---|---|---|---|---|---|---|
| Source MAC | X | — | X | — | — | — |
| Destination MAC | X | X | — | — | — | — |
| Source IP | X | X | X | — | — | — |
| Destination IP | X | X | X | — | — | — |
| Protocol ID | X | X | X | X | X | — |
| Source Port | X | X | X | X | X | — |
| Destination Port | X | X | X | X | X | — |

DEVICE-LEVEL TEMPLATE 300A
INTERFACE-LEVEL TEMPLATE 300B
LINK-LEVEL TEMPLATE 300C
PATH-LEVEL TEMPLATE 300D
SITE-LEVEL TEMPLATE 300E
APPLICATION-LEVEL TEMPLATE 300F

FIG. 3

SYSTEMS AND METHODS OF NETWORK MONITORING

CROSS REFERENCE TO RELATED APPLICATIONS

This application claims the benefit of U.S. Provisional Application No. 60/776,546, filed Feb. 23, 2006, and hereby incorporated by reference herein.

FIELD OF THE DISCLOSURE

The present disclosure relates to monitoring of network traffic, and more specifically, to multi-level configurable network monitoring.

BACKGROUND

Monitoring of network traffic has a broad range of applications, from network re-design and provisioning to detection of malicious network attacks. Conventional network monitors allow some degree of flexibility in choosing what type of traffic is captured. For example, a user can specify that all packets to a particular link-level or network-level address are captured. However, once a particular capture configuration is selected, conventional network monitors require redeployment or reinstallation of the network monitor to change the capture configuration. Yet it is often difficult for a user to foresee in advance what type of traffic will be useful to him if captured. This forces the user to take a trial-and-error approach. First the user selects a particular configuration to capture traffic and analyzes the captured traffic. If the user determines from this analysis that another type of traffic would be useful to him but was not captured, the user reinstalls the network monitor with another capture configuration and tries again. Therefore, a need exists for these and other problems to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 3 is a table describing several predefined filter templates.

SUMMARY

Systems and methods of network monitoring are disclosed. One exemplary method includes receiving a first packet, creating a filter instance if the first received packet matches a filter template, receiving a second packet, and storing the second received packet if the second received packet matches the created filter instance. The filter instance is based at least partially on the filter template. An exemplary system includes a network interface, a memory, and a processor. The memory stores program code which programs the network monitor device to receive a first packet, create a filter instance if the first received packet matches a filter template, receive a second packet, and store the second received packet if the second received packet matches the created filter instance. The filter instance is based at least partially on the filter template.

DETAILED DESCRIPTION

Figure 1:
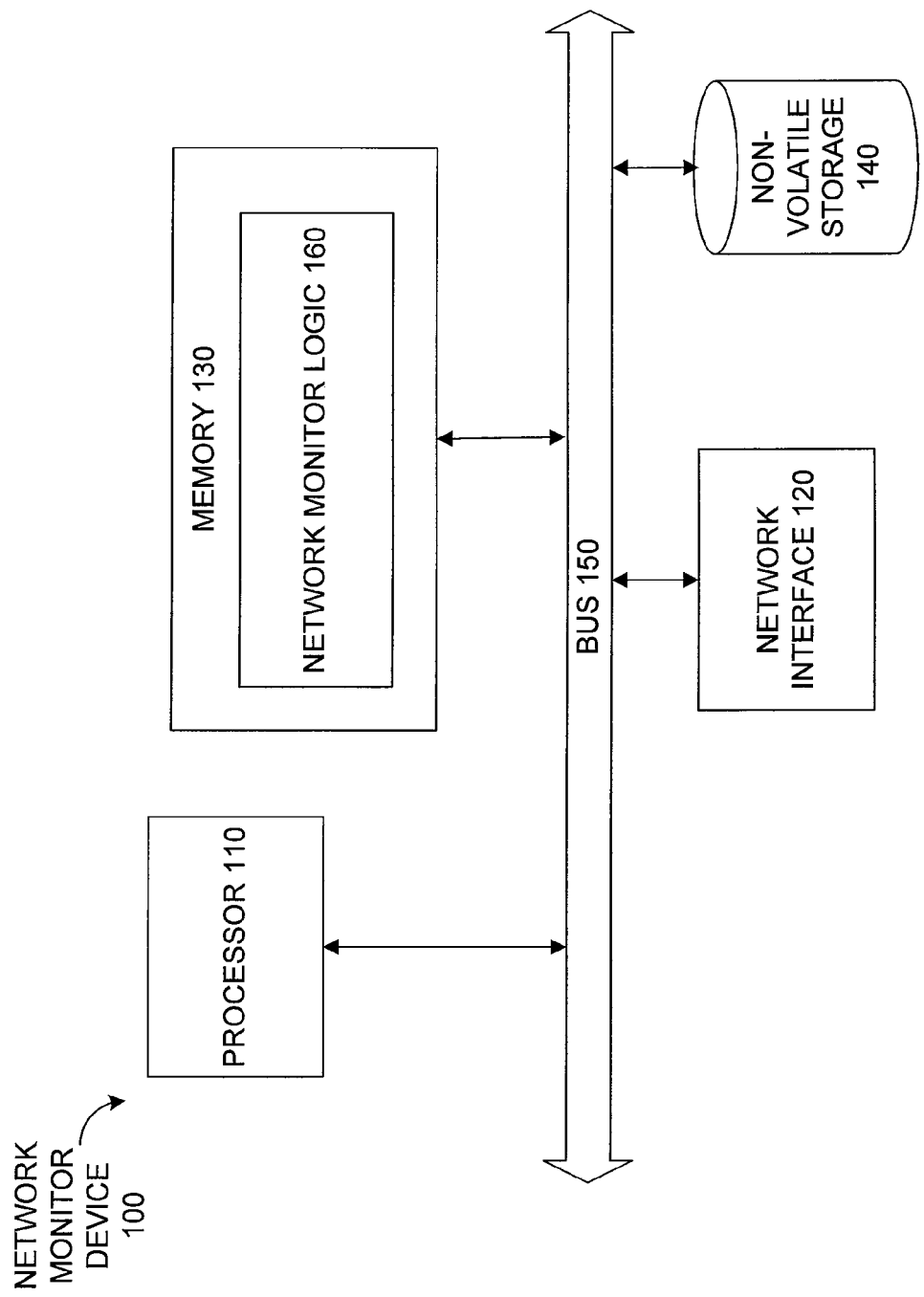
FIG. 1 is a hardware block diagram of a network monitor device 100 in accordance with the system and method for improving performance of transport protocols.

FIG. 1 is a hardware block diagram of a network monitor device 100 in accordance with a system and method for network monitoring. The network device contains a number of components that are well known in the art of data communications, including a processor 110, at least one network interface 120, memory 130, and non-volatile storage 140. A person of ordinary skill in the art should understand that the networks interfaces may be of different types, support different medias and speeds, etc. Examples of non-volatile storage include, for example, a hard disk, flash RAM, flash ROM, EEPROM, etc. These components are coupled via bus 150. Memory 130 contains network monitor logic 160. As described in further detail below, network monitor logic 160 supports several different types of monitoring, providing different levels of control to the user. Omitted from FIG. 1 are a number of conventional components, known to those skilled in the art, that are not necessary to explain the operation of network monitor device 100.

As known to a person of ordinary skill in the art, network monitoring applications and/or systems operate by applying packet filters to incoming and/or outgoing packets. A packet that passes through the filter is captured for later analysis, and a packet that is excluded by the filter is discarded. Packet filters are defined in terms of values associated with protocol header fields. Thus, a packet filter defined as "IP header.Protocol_ID=6" would be described as a generic "TCP filter", since TCP packets are defined as those with the value 6 in the Protocol_ID field of an IP header.

Network monitor logic 160 builds on the notion of packet filters by introducing the new concepts of packet filter templates and packet filter instances. A packet filter template can be viewed as a set of protocol header fields and associated values. The values can be fixed values (e.g., numeric, string), or special values such as Don't Care or Wildcard. A packet filter instance is instantiated from a packet filter template: some header fields use values inherited from the template; other header fields have values specified at instantiation. As described in more detail below, the values specified at instantiation may come from the user, or from network monitor device 100, or from packets received from network monitor device 100.

Network monitor logic 160 uses packet filter instances to determine which packets are captured. Network monitor logic 160 uses packet filter templates to create packet filter instances. Packet filter templates can contain header fields with a Wildcard value, but when a packet filter instance is created, network monitor logic 160 replaces this wildcard by a specific value. Network monitor logic 160 then uses that value, associated with a particular header field, to determine whether a received packet matches the filter and is therefore captured (i.e., the packet matches if the corresponding field in the packet header has the same value as in the filter instance). If more than one header field in a filter instance contains a specific value, then all such fields are used to determine a match (i.e., match/not-match on fields are ANDed together). Packet filter instances can contain header fields with a Don't Care value. Such fields are not used in determining a match with the instance. Thus, packet filter instances allow a range of capture behavior from the coarsest granularity (Don't Care in all header fields to capture all packets) to the finest granularity (specific values in all header fields), and combinations in between.

One embodiment of network monitor logic 160 allows a user to define packet filter templates, and uses data discovered from incoming and/or outgoing packets to create packet filter instances from these user-defined templates. This feature will be referred to in this disclosure as a User-Defined Filter Template with Learned Instantiation. Another embodiment of network monitor logic 160 includes a number of predefined packet filter templates, and uses data discovered from incoming and/or outgoing packets to create packet filter instances from these predefined templates. This feature will be referred to in this disclosure as a Predefined Filter Template with Learned Instantiation. Yet another embodiment of network monitor logic 160 includes user-configurable packet filter instances. This feature will be referred to in this disclosure as a User-Configured Filter. Yet another embodiment of network monitor logic 160 allows the user to capture all packets, but to store only particular headers. Yet another embodiment of network monitor logic 160 supports remote monitoring of devices in combination with filter templates and filter instances. A particular embodiment may contain combinations of these features.

User-Defined Filter Template with Learned Instantiation

This embodiment, referred to herein as network monitor logic 160', allows a user to create a packet filter template which will be used to create packet filter instances. The user describes a packet filter template by specifying one or more header fields and corresponding values. For each selected header field in the user-defined packet filter template, the user specifies a value to be matched. This value may be a fixed value (e.g., numeric, string), or it may be a special value such as Don't Care or Wildcard. In the examples described in this disclosure, the 'X' character represents the special Don't Care value, and the '*' character represents the special Wildcard value, but other representations are possible. An exemplary list of protocol header fields from which the user selects includes: source IP address; destination IP address; protocol identifier; source port; and destination port. However, other embodiments may use other header fields in addition to, or instead of, these listed fields. The details of the mechanism used to create, describe, enable, disable, and delete packet filter templates will not be discussed here. Two examples are a command line interface and a graphical user interface.

One example of a user-defined packet filter template is

| Source IP Address = | * |
|---|---|
| Destination IP Address = | 192.168.6.5 |
| Source Port = | X |
| Destination Port = | X |
| Protocol Identifier = | X |

The presence of the wildcard value for Source IP address causes network logic 160' to create a new packet filter instance every time a new source IP address is encountered in a packet that also has a destination IP address of 192.168.1.5. Once created, the filter instance causes network monitor logic 160' to capture packets matching the filter instance. This particular filter template will capture TCP and UDP packets, as well as ICMP, etc., since the Protocol Id field is a Don't Care.

Another example of a user-defined packet filter template is

| Source IP Address = | 192.168.1.5 |
|---|---|
| Destination IP Address = | 192.168.6.5 |
| Source Port = | * |
| Destination Port = | X |
| Protocol Identifier = | 6 |

The presence of the wildcard value for Source Port causes network monitor logic 160' to create a new packet filter instance every time a new source port is encountered on any TCP connection (Protocol Id=6) from 192.168.1.5 to 192.168.6.5. As before, the presence of a filter instance then causes network monitor logic 160' to capture those packets which match the filter.

Packet processing using user-defined packet filter templates and packet filter instances will now be described in connection with the data flow diagram of FIG. 2. A packet (or a portion of a packet) is provided to network monitor logic 160' by a network interface 120. The header of the packet is examined by classifier logic 210, which determines whether the header fields match one or more packet filter instances in a packet filter instance list 220. The concept of filter matching should be familiar to a person of ordinary skill in the art: header fields in the filter instance are compared to corresponding fields in the packet, with Don't Care values being left out of the comparison, and the individual field matches are ANDed together to produce a final match determination.

Classifier logic 210 makes a match determination for each filter instance 230 within packet filter instance list 220. A given packet may match multiple filter instances 230.

If a match on a particular filter instance 230 is found, information about the packet is stored in packet capture storage 240. The type and amount of packet information stored depends on the implementation: some variations include the entire packet, selected headers only, and/or timestamp of packet arrival. The information stored may also include an identifier of the matching filter. A packet viewer interface 250 accesses the packets in capture storage 240 and presents a view to the user. The captured packets, or a subset thereof, may also be analyzed or post-processed by post-processor 260, for example, to produce statistics or performance metrics such as average throughput, average delay, average loss-rate, throughput deviation, delay deviation, and loss-rate deviation. The functionality of viewer 250 and post-processor 260 should be familiar to a person of ordinary skill in the art and will not be further described in this disclosure.

After matching on filter instances 230, the packet (or portion thereof) is provided to template match logic 270, which determines whether the packet header matches one or more packet filter templates 280 in a packet filter template list 290. Each filter template 280 is processed as follows. Header fields in each filter template 280 are compared to corresponding fields in the packet, with Don't Care and Wildcard values being left out of the comparison. If all compared fields have a match, then template match logic 270 creates a filter instance 230 based on the template 280.

Filter instance 230, created by template match logic 270, inherits values from template 280, except for wildcard values, which are set based on values of corresponding fields in the received packet. For example, if template 280 specified "192.168.6.5" for destination IP address and "192.168.15.200" for source IP address, then instance 230 gets those same values for the destination IP address header field and the source IP address header field. If template 280 specified Wildcard for source IP port, then the source IP port in the received packet is copied into the source IP port header field in instance 230.

Template match logic 270 then adds this newly created filter instance 230 to packet filter instance list 220, so that filter instance 230 is used by classifier logic 210 to find matches on the next received packet. If newly created filter instance 230 is already present in packet filter instance list 220, the add request for the duplicate is ignored by packet filter instance list 220, and so template match logic 270 deletes newly created filter instance 230.

Alternatively, template match logic 270 may determine whether a filter instance 230, corresponding to the template field with the wildcard, is already present in packet filter instance list 220 before creating the filter instance 230. In other words, if template 280 has a wildcard value for source IP port, and the received packet has the value 80 for the source IP port, then template match logic 270 may determine whether packet filter instance list 220 already contains a filter instance with source IP port=80 and which also matches all the specified values in the template (e.g., "192.168.6.5" for destination IP address). If so, template match logic 270 does not create a new filter instance.

It should be appreciated by a person of ordinary skill in the art that the processing described above has the effect of allowing network monitor logic 160' to "learn" new values present in received packets, and to use them to create new packet filter instances 230. This can be seen from the following example scenario, in which a packet filter template 280 specifies a destination IP address of "192.168.6.5", a Wildcard for source IP address, and Don't Care for the other header fields. Initially, no packet filter instances 230 have been created from this template 280 and in this example, no other filter instances 230 specify "192.168.6.5" as a destination IP address.

In this scenario, the first packet received with a destination IP address of "192.168.6.5" also has a source IP address of "192.168.15.200". Classifier logic 210 does not find a match for this packet on any filter instance 230. However, template match logic 270 does find a match on the filter template 280. The packet is stored in packet capture storage 240, and a packet filter instance 230 is created having "192.168.6.5" (from the template) and "192.168.15.200" (from the received packet) in the destination and source IP address fields, respectively. Subsequent occurrences of packets from source "192.168.15.200" to "192.168.6.5" produce a match on filter instance 230, so that these packets are stored to packet capture storage 240. But these packets do not cause a new filter instance 230 to be created, since this will be viewed as a duplicate instance. In contrast, the first occurrence of a packet with destination IP address of "192.168.6.5" and a different source IP address, e.g., "255.255.0.0", does cause a second packet filter instance 230 to be created, with "192.168.6.5" and "255.255.0.0" in the destination and source IP address fields, respectively.

Figure 2:
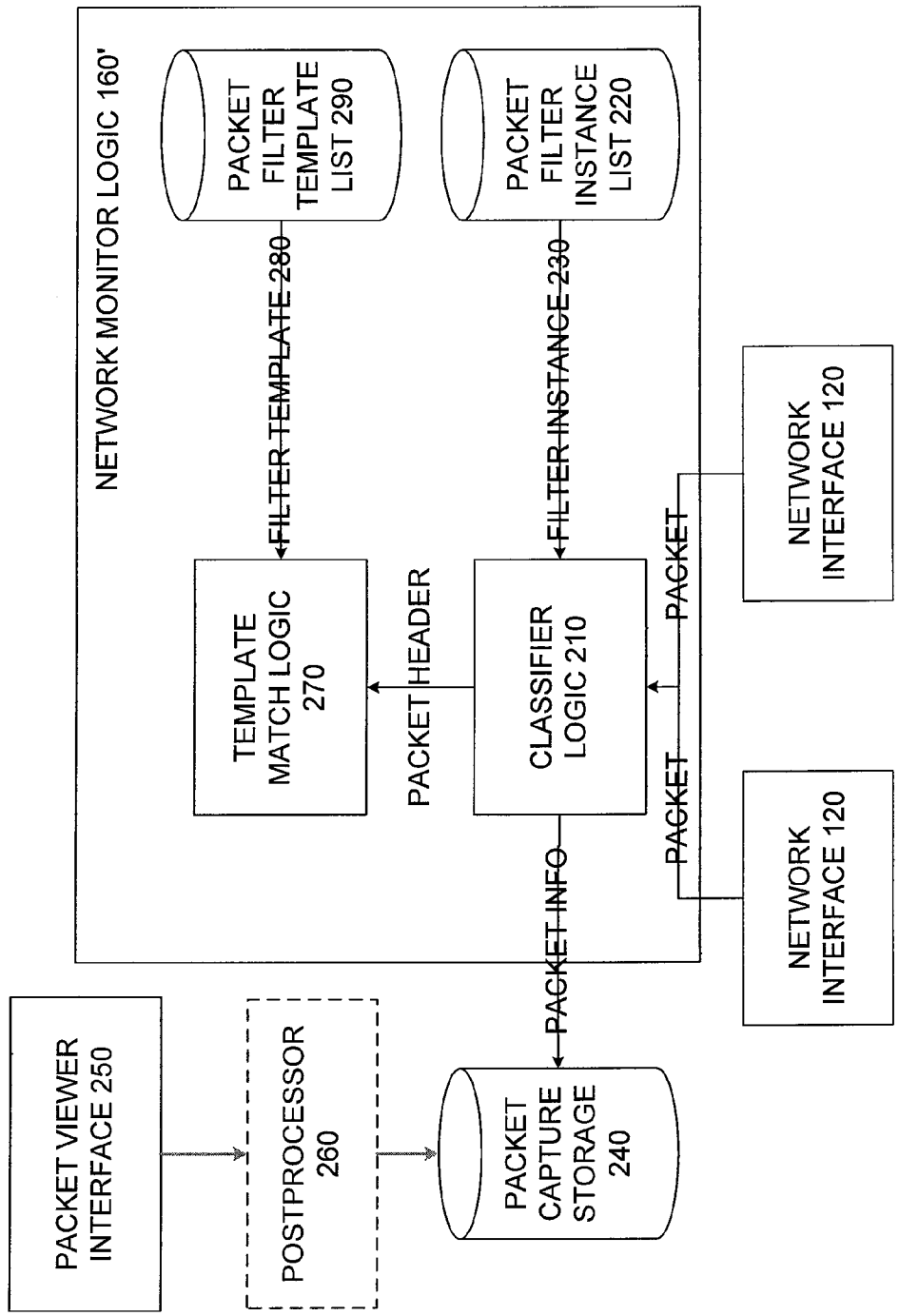
FIG. 2 is a data flow diagram which shows packet processing using user-defined packet filter templates and packet filter instances.

A person of ordinary skill in the art should recognize the components illustrated in FIG. 2 as abstractions chosen to illustrate how one embodiment of a system and method for network monitoring partitions functionality among components. Such a person should also recognize that other divisions of functionality are also possible, and these other possibilities are intended to be within the scope of this disclosure. Furthermore, although the objects in FIG. 2 are described in terms of specific data structures (e.g., lists), a person of ordinary skill in the art should appreciate that other data structures providing similar functionality can be used instead. As just one example, a particular implementation might use an array instead of a linked list. In general, the objects used by the systems and methods for network monitoring are described herein in terms of code and data, rather than with reference to a particular hardware device executing that code. Furthermore, although the system and methods are described in object-oriented terms, there is no requirement that the systems and methods be implemented in an object-oriented language. Rather, one of ordinary skill in the art will understand that the systems and methods can be implemented in any programming language, and executed on any hardware platform.

Predefined Filter Template with Learned Instantiation

This embodiment of network monitor logic, referred to herein as network monitor logic 160", includes a number of predefined packet filter templates, and uses data discovered from incoming and/or outgoing packets to create packet filter instances from these predefined templates. The table shown in FIG. 3 describes several predefined filter templates 300A-F.

Rows represent protocol header fields: source MAC address; destination MAC address; source IP address; destination IP address; protocol identifier; source port; and destination port. Columns represent individual predefined templates: device-level; interface-level; link-level; path-level; site-level and application-level. The value in each cell is either Don't Care (X) or Required (!). As can be seen in the table, the packet filter templates become increasingly finerf, with more and more fields as Required rather than Don't Care. That is, a packet filter instantiated from an application-level filter template excludes the most traffic (i.e., has the finest granularity), and a filter instantiated from a device-level filter template captures all traffic (i.e., has the coarsest granularity).

The device-level filter 300A captures all network traffic transmitted by, or received by, network monitor device 100. The interface-level filter 300B captures all network traffic transiting a particular network interface 120 on network monitor device 100. The link-level filter 300C captures all network traffic between network monitor device 100 and another directly connected (i.e., next hop) device, specified by a link-layer address. The path-level filter 300D captures a subset of packets flowing between network monitor device 100 and a destination device, specified by a network-layer address. The captured subset includes those packets that reach the destination device by passing through a specific sequence of other devices. The site-level filter 300E captures all traffic flowing between network monitor device 100 and a destination device, specified by a network-layer address, regardless of path. The application-level filter 300F captures all traffic on a particular well-known port traversing network monitor device 100.

Network monitor logic 160" does not perform packet filtering using the predefined filter templates 300, but rather using packet filter instances created from the predefined filter templates 300, where fields marked as Required are populated with values learned from monitored traffic and from the configuration of network monitor device 100. The process of learning from monitored traffic will be described now in connection with FIGS. 4 and 5.

Figure 4:
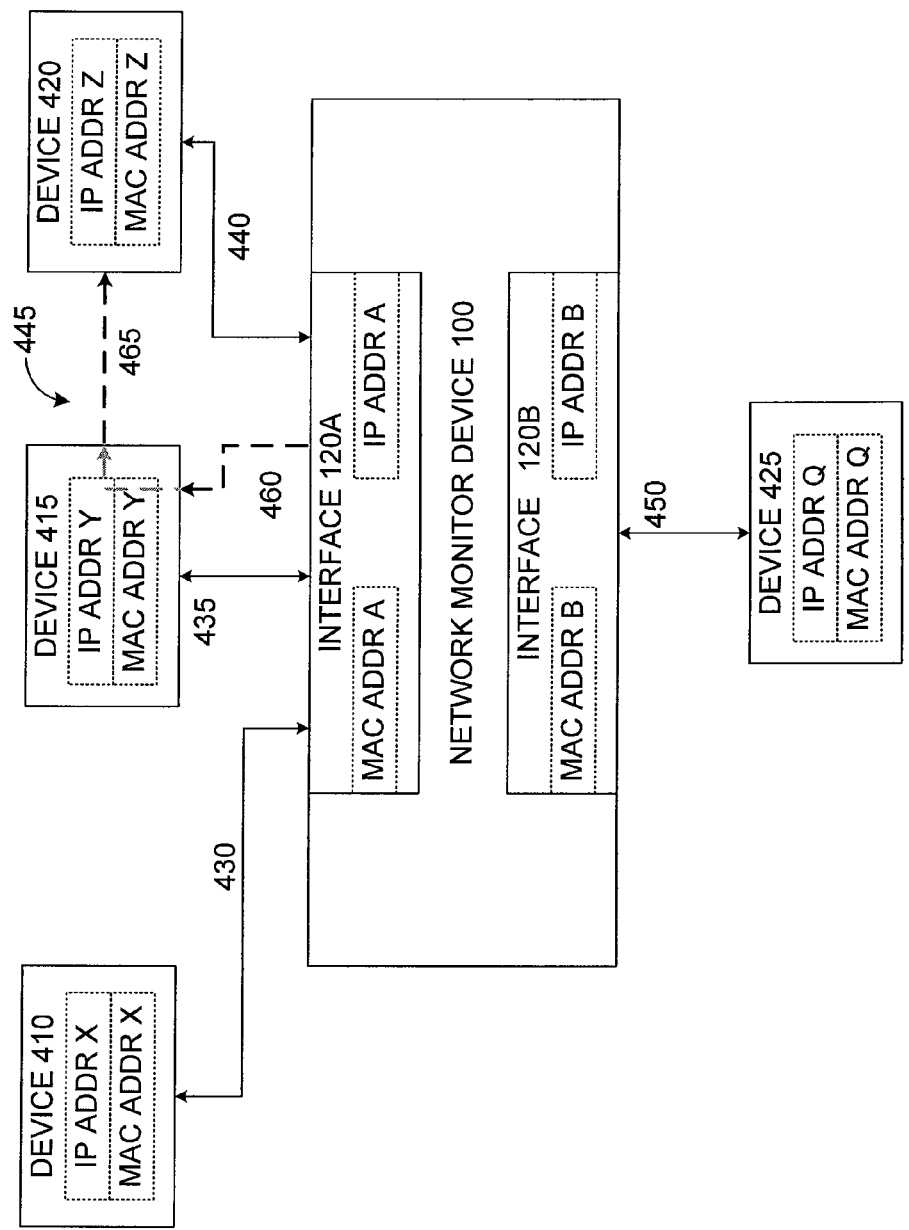
FIG. 4 is an example network configuration which includes network monitor device 100 from FIG. 1.

FIG. 4 is an example network configuration which includes network monitor device 100 and several other devices (410, 415, 420, and 425). In FIG. 4, there are five traffic flows between network monitor device 100 and the four other devices. Four flows involve network interface 120A: flow 430 goes to device 410; flow 435 goes to device 415; flow 440 goes to device 420; and flow 445 also goes to device 415. One flow involves network interface 120B: flow 450 goes to device 410; flow 455 goes to device 425. A person of ordinary skill in the art should appreciate that flow 440, which traverses through device 415 get to device 420, is made up of two legs, 460 and 465 (shown by dashed lines).

In this example, network monitor device 100 includes two network interfaces, 120A and 120B. At start-up, network monitor logic 160" queries network interfaces 120 to determine the link-layer (MAC) address and network-layer (IP) address of each interface. network monitor logic 160" creates an interface-level packet filter instance for each network interface, using the discovered interface addresses to populate the source MAC address field and/or source IP address field of the packet filter instance. At start-up, network monitor logic 160" also creates an application-level packet filter instance for a set of predefined applications. Each of these predefined applications corresponds to a well-known port number, for example: HTTP (port 80); SSH (port 22); and FTP (port 21). Each application-level packet filter instance is populated with one of these predefined port numbers.

Network monitor logic 160" then observes packets traversing network monitor device 100. From received packets, network monitor logic 160" learns the MAC addresses of devices that are directly coupled to network monitor device 100. (A person of ordinary skill in the art will appreciate that this is similar to the behavior of a link-layer bridge.) In the example configuration of FIG. 4, network monitor logic 160" learns of the presence of device 410 by examining packets on flow 430. Similarly, network monitor logic 160" learns of device 415 by examining packets from flow 435, and of device 420 from flow 440, and of device 425 by flow 455.

In response, network monitor logic 160" also creates a link-level packet filter instance for each of these flows, using the discovered MAC addresses to populate the destination MAC address field of each packet filter instance. In some embodiments, the source MAC address field of the filter instance is a Don't Care value. In this scenario, the result is four link-level packet filter instances: a first filter with destination MAC address of X and source MAC address of Don't Care; a second filter with destination MAC address of Y and source MAC address of Don't Care; a third filter with destination MAC address of Z and source MAC address of Don't Care; and a fourth filter with destination MAC address of Q and source MAC address of Don't Care.

In other embodiments, the source MAC address field of the filter instance is set to the MAC address of the interface on which the flow was received. For example, the source MAC address of the filter instance created for device 425 is set to the MAC address of network interface 120B. Similarly, the source MAC address for the filter instances associated with devices 410, 415 and 420 is set to the MAC address of network interface 120A. In this scenario, the result is four link-level packet filter instances: a first filter with destination MAC address of X and source MAC address of A; a second filter with destination MAC address of Y and source MAC address of A; a third filter with destination MAC address of Z and source MAC address of A; and a fourth filter with destination MAC address of Q and source MAC address of B.

The packets in these same flows (430, 435, 440, 455) from directly coupled devices also inform network monitor logic 160" of the IP addresses of those devices. In response, network monitor logic 160" creates a site-level packet filter instance for each of these directly coupled devices. In a manner similar to the creation of link-level instances described above, one embodiment of network monitor logic 160' populates the destination IP address field of each packet filter instance with the discovered IP addresses, and populates the source IP address field with the Don't Care value. In this scenario, the result is four site-level packet filter instances: a first filter with destination IP address of X and source IP address of Don't Care; a second filter with destination IP address of Y and source IP address of Don't Care; a third filter with destination IP address of Z and source IP address of Don't Care; and a fourth filter with destination IP address of Q and source IP address of Don't Care.

In another embodiment, network monitor logic 160" populates the source IP address field of the site-level packet filter instance with the source IP address of the appropriate interface. In this scenario, the result is four site-level packet filter instances: a first filter with destination IP address of X and source IP address of A; a second filter with destination IP address of Y and source IP address of A; a third filter with destination IP address of Z and source IP address of A; and a fourth filter with destination IP address of Q and source IP address of B.

Some embodiments of network monitor logic 160" support path-level filters by communicating with other devices, such as routers, to learn about network-level paths or routes. A path-level filter specifies the IP address of each hop in the route it takes to reach a destination. In FIG. 4, two paths from network monitor logic 160" to device 420 exist: a direct path represented by flow 440; and a two-hop path through device 415, represented by the legs 460 and 465 of flow 445.

As described earlier, a predefined application-level filter captures all traffic for a particular well-known application (i.e., port), regardless of the source or destination. Some embodiments of network monitor logic 160" support a variation of the application filter which adds filtering at a second level. Examples are application-site level, application-path level, application-link level, and application-interface level. By filtering by site, an application-site filter can capture HTTP packets flowing between network monitor device 100 and a specific destination IP address, while ignoring RTP packets, SSH packets. etc., to that same destination.

Figure 5:
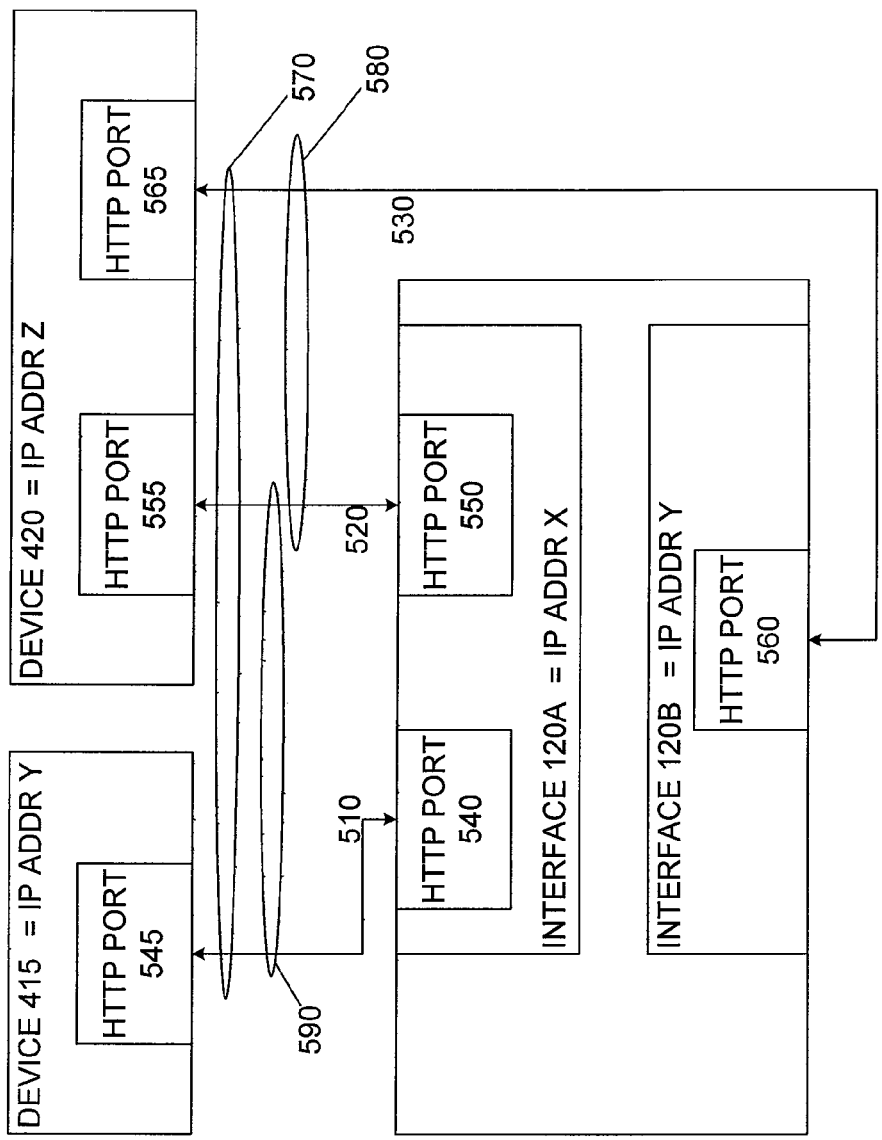
FIG. 5 is another example network configuration which includes network monitor device 100 from FIG. 1.

The application-site and application-interface predefined filters will now be described with reference to FIG. 5. FIG. 5 shows network traffic flowing between network monitor device 100 and device 415 (flow 510), and traffic flowing between network monitor device 100 and device 420 (flows 520 and 530). The network devices include transport-layer ports, which a person of ordinary skill in the art should recognize as a logical abstraction rather than a physical structure. In the example of FIG. 5, a total of three HTTP ports are open on network monitor device 100. One HTTP port i540 is (logically) connected through network interface 120A to a corresponding port 545 on device 415. A second HTTP port 550 is connected, also through network interface 120A, to port 555 on a different device. The third HTTP port 560 is connected to the same device 420 (at port 565) but through network interface 120B.

An application predefined filter which specifies HTTP as the application captures all the HTTP traffic. In the network configuration of FIG. 5, this corresponds to all three flows, shown as group 570. In contrast, an application-site filter which further specifies device 420 as the site captures packets on flows 520 and 530 (shown as flow group 580), but not on flow 510. Also, an application-interface filter which further specifies network interface 120A as the interface captures packets on flows 510 and 520 (shown as group 590), but not on flow 530.

User-Configurable Filter Instances

This embodiment of network monitor logic 160, referred to herein as 160*, includes user-configurable packet filter instances. This embodiment does not use filter templates. Instead, the user directly defines packet filter instances, by specifying which protocol header fields are examined for a match, and the value required for each for a match. The values can be fixed values (e.g., numeric, string), or a special Don't Care character (e.g., 'X') which indicates that the header field is not used in determining a match with the instance. One example of a user-configurable filter instance, which captures all TCP traffic, is: source IP address=X; destination IP address=X; source port=X; destination port=X; Protocol ID=6. Another example, which captures all HTTP traffic, is: source IP address=X; destination IP address=X; source port=X; destination port=80; protocol ID=6. A third example, which captures all SSH traffic from IP address 192.168.1.5 to IP address 192.168.6.5, is: source IP address=192.168.1.5; destination IP address=192.168.6.5; source port=X; destination port=22; Protocol ID=6. Note that the HTTP and SSH filters overlap the TCP filter: TCP traffic necessarily includes all HTTP and SSH traffic.

Brute Force Monitoring

Yet another feature of the network monitor logic disclosed herein allows the user to store all packets traversing the network monitor device, along with a timestamp for each. Since all packets are stored, the user is not required to configure a filter, but this feature does allow the user to specify which packet header fields are stored. As one example, a user could specify storage of all fields in all headers, from the link-layer to the session-layer. As another example, the user could specify storage of all fields of network-layer and transport-layer headers. As yet another example, the user could specify storage of specific fields in specific layers, such as source MAC address, destination IP address, and TCP socket. Other variations are also possible.

The user may also specify the amount of packets stored, expressed as either a number of packets, or in units of time ("capture for 5 minutes"). A corresponding packet viewer interface allows the user to view a selected subset, or all, or the stored packets. For example, the user could request a view of the last 15 minutes captures, or a view of the packets captured during a time range, or a view of the last 10,000 packets, or a view of a specified range of packet numbers.

When viewing performance statistics, the user can also specify the time duration used by the statistics collector. For example, the user can specify that packets are captured for a two-hour period of time, where statistics are maintained in one-hour buckets. The user could then view statistics for the first hour and the second hour, independently.

Remote Monitoring

As described above, packet filter templates and packet filter instances are defined by fields in the packet header. Yet another feature of network monitor logic disclosed herein allows any such template or instance to be associated with a list of addresses of remote devices at which monitoring is performed. This feature also applies to brute force monitoring. Several examples of extended definitions of filter templates and instances to support this feature are shown below.

| User-Configurable Filter Instance: all TCP traffic from devices local, IP1, IP2 | |
|---|---|
| Source IP Address = | X |
| Destination IP Address = | X |
| Source Port = | X |

| -continued | |
|---|---|
| Destination Port = | X |
| Protocol Identifier = | 6 |
| ReportFrom = | local, IP1, IP2 |
| User-Configurable Filter Template: filters for every TCP connection with a new source port from 192.168.1.5 to 192.168.6.5, as monitored at devices: local, IP2 | |
| Source IP Address = | 192.168.1.5 |
| Destination IP Address = | 192.168.6.5 |
| Source Port = | * |
| Destination Port = | X |
| Protocol Identifier = | 6 |
| ReportFrom = | local, IP2 |

When a device is configured with a remote filter instance or remote filter template, the device explicitly registers itself with the specified remote devices in order to receive reports on those specific filters and filters matching those specific filter templates. The reports are received periodically. A default period may be used, or the period may be specified by the user.

Each device maintains filter templates and filter instances in a list (or lists). Each device also maintains a list of the Report-To device addresses that are associated with its filter templates and filter instances. When a device receives a registration for a remote filter instance or remote filter template, that device adds the filter instance or filter template to its list with the appropriate report to address. If the filter instance or filter template already exists in the list, the device adds the Report-To address to the list addresses for that filter instance or filter template.

Two examples of remote filter lists are are shown below.

| Example Filter Instance List | |
|---|---|
| Filter Instance | Report to |
| Source IP address = 192.168.1.5, Protocol_ID = 6 | Local |
| Source port = 80 | Local, IP1, IP2 |
| Example Filter Template List | |
| Filter Template | Report to |
| Source IP address = *, Protocol_ID = * | Local, IP2 |
| Source port = * | Local, IP1, IP3, IP4 |

Whenever creation of a new filter instance is triggered because of an existing filter template, the newly created filter instance inherits all the Report-To addresses from the filter template. Whenever a filter instance is updated, if the time elapsed since the last reporting of that filter instance to any of its Report-To addresses is greater than or equal to the reporting frequency defined for that address, the device reports a snapshot of that filter instance to that address.

In summary, the remote monitoring process involves two devices. One "master" device sends to a "slave" device a filter request which includes one or more filter templates and/or filter instances, along with the address of the master. On receipt of the request, the slave device monitors, or captures packets, in accordance with the filter instance and/or template included with the request. (Details of filtering with instances and templates was described above.) The request also causes the device to send periodic reports to the master device, using the address specified in the request. The report may take the form of raw captured packet data, post-processed data, and/or statistics.

Combined Features

The various features disclosed herein can be combined in a variety of ways. One such combination will now be described in connection with the flowchart of FIGS. 6A and 6B. This particular combination includes user-defined filter templates with learned instantiation, predefined filter templates with learned instantiation, user-configurable filter instances, and brute force monitoring.

Figure 6A:
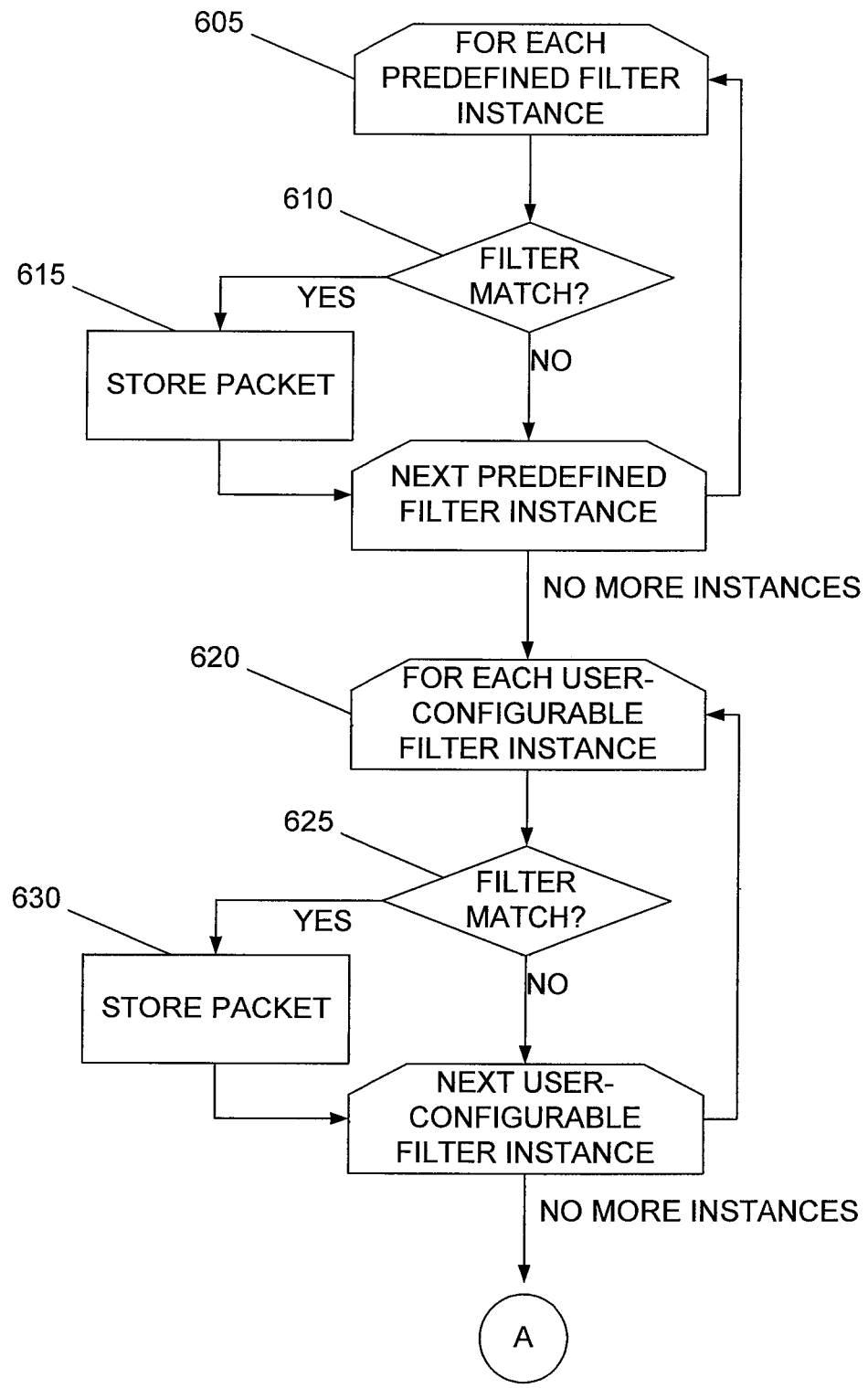
FIGS. 6A and 6B combine to form a flowchart describing how the network monitor device 100 from FIG. 1 processes a received packet.
Figure 6B:
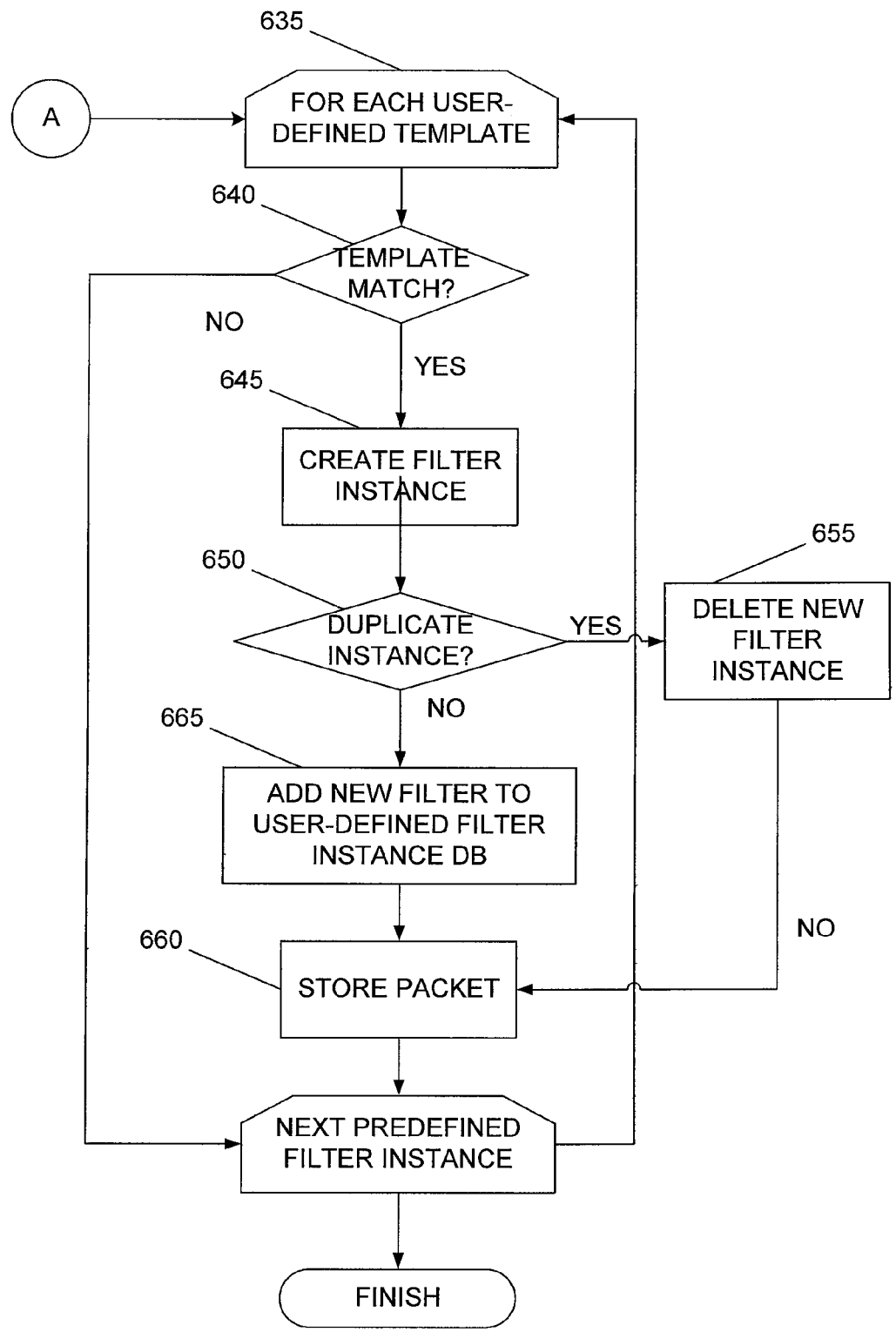

The flowchart in FIGS. 6A and 6B describes processing of a received packet by network monitor logic 160. The process begins at block 605, which starts an iteration loop that is applied for each predefined filter instance. Next, at block 610 the received packet is compared for a match with the current predefined filter instance. If the packet matches the filter, then the packet is stored (block 615). After the match determination, processing returns to block 610 where the next predefined filter instance is checked for a match, until the loop ends when all predefined filter instances have been handled.

Processing then continues at block 620, which starts an iteration loop that is applied for each user-configurable filter instance. Next, at block 625 the received packet is compared for a match with the current predefined filter instance. If the packet matches the filter, then the packet is stored (block 630). After the match determination, processing returns to block 625 where the next user-configurable filter instance is checked for a match, until the loop ends when all user-configurable filter instances have been handled.

Processing continues at block 635 (FIG. 6B), which starts an iteration loop that is applied for each user-defined filter template. Next, at block 640 the received packet is compared for a match with the current user-defined filter template. If the packet does not match the template, processing returns to block 640 where the next current user-defined filter template is checked for a match, until the loop ends when all user-defined filter templates have been handled.

If instead block 640 determines that the received packet does match the template, then at block 645 a new filter instance based on the matching template is created. Block 650 determines whether or not the newly created filter instance is a duplicate, and if so the new filter instance is deleted at block 655. Processing then continues at block 660, where the matching packet is stored. The next loop iteration is then performed, starting again at block 640 with the next user-defined filter template. If block 650 determines that the newly created filter instance is not a duplicate, then the filter instance is added to the list at block 665, and the matching packet is stored at block 660. When the iteration loop completes, process of the received packet is finished. Any process descriptions or blocks in flowcharts should be understood as representing modules, segments, or portions of code which include one or more executable instructions for implementing specific logical functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The systems and methods disclosed herein can be implemented in software, hardware, or a combination thereof. In some embodiments, the system and/or method is implemented in software that is stored in a memory and that is executed by a suitable microprocessor, network processor, or microcontroller situated in a computing device. In other embodiments, the system and/or method is implemented in hardware, including, but not limited to, a programmable logic device (PLD), programmable gate array (PGA), field programmable gate array (FPGA) or an application-specific integrated circuit (ASIC).

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

We claim:

1. A method for network monitoring comprising the steps of:
   receiving a first packet;
   creating a first filter instance if the first received packet matches a filter template, the first filter instance based at least partially on the filter template;
   receiving a second packet;
   storing the second received packet if the second received packet matches the created first filter instance; and
   creating a second filter instance based at least in part on information contained in a third received packet and at least in part on one of a plurality of predefined filter templates.

2. The method of claim 1, wherein the first filter instance is based at least partially on the first received packet.

3. The method of claim 1, further comprising the step of:
   determining whether the first received packet matches one or more of a plurality of filter templates.

4. The method of claim 1, further comprising the step of:
   determining whether the first received packet matches one or more of a plurality of predefined filter templates.

5. The method of claim 1, further comprising the step of:
   determining whether the first received packet matches one or more of a plurality of user-defined filter templates created by a user.

6. The method of claim 1, further comprising the step of:
creating a filter instance based at least in part on a protocol header field contained in a third received packet and at least in part on a wildcard value found in one of a plurality of filter templates.

7. The method of claim 1, further comprising the step of:
creating a filter instance based at least in part on a protocol header field contained in a third received packet and at least in part on a wildcard value found in one of a plurality of predefined filter templates.

8. The method of claim 1, further comprising the step of:
adding the created first filter instance to a list of filter instances.

9. A network monitor device comprising:
a network interface;
memory having program code stored thereon; and
a processor programmed by at least the program code to enable the network monitor device to:
receive a first packet from the network interface;
create a filter instance if the first received packet matches a filter template, the filter instance based at least partially on the filter template;
receive a description of the filter template including at least one protocol header field and at least one value associated with the at least one protocol header field;
receive a second packet from the network interface; and
store the second received packet if the second received packet matches the created filter instance.

10. The device of claim 9, wherein the filter instance is based at least partially on the first received packet.

11. The device of claim 9, wherein the processor is further programmed to:
determining whether the first received packet matches one or more of a plurality of filter templates.

12. The device of claim 9, wherein the processor is further programmed to:
receive a description of the filter template including at least one protocol header field and at least one value associated with the at least one protocol header field, the at least one value selected from a plurality of values which includes a wildcard value.

13. The device of claim 9, wherein the processor is further programmed to:
receive a description of the filter template including at least one protocol header field and at least one value associated with the at least one protocol header field, the at least one value selected from a plurality of values which includes a wildcard value and a don't care value.

14. A system for network monitoring comprising:
means for receiving a first packet;
means for creating a filter instance if the first received packet matches a filter template, the filter instance based at least partially on the filter template;
means for receiving a second packet;
means for storing the second received packet if the second received packet matches the created filter instance;
means for receiving a monitor request from a remote device, the request including a filter instance and an address;
means for capturing packets in accordance with the filter instance; and
means for sending a report associated with the captured packets to the address in the request.

15. The system of claim 14, further comprising:
means for storing all of a plurality of packets received during a time window, the duration of the time window specified by a user.

16. The system of claim 15, further comprising the step of:
means for displaying at least a portion of the received plurality of packets, the portion specified by a user as a number of time windows.

* * * * *